Reissued Mar. 16, 1937

Re. 20,295

UNITED STATES PATENT OFFICE 20,295

PROCESS OF COLORING GRANULAR SLATE AND THE LIKE

Harry C. Fisher, Cincinnati, Ohio, assignor, by mesne assignments, to Minnesota Mining & Manufacturing Company, St. Paul, Minn., a corporation of Delaware No Drawing. Original No. 1,742,440, dated January 7, 1930, Serial No. 22,878, April 13, 1925. Application for reissue November 6, 1933, Serial No. 696,913

26 Claims. (Cl. 91—70)

My process relates to the formation of artificial colors upon slate which has been crushed to form granules prior to the color addition and treatment.

My process is applicable to other mineral granular material, but its development has been chiefly for its application to granular slate.

It is the object of my invention to provide a process for forming a glazed, colored surface tightly adherent to the material in question and in some instances fused to the slate. I have discovered that sodium silicate in solution together with a metal salt to form a glass with the silicate at roasting temperatures, and together with such pigmenting agents as desired can be used very economically to produce extremely permanent glazed colored finishes on slate granules, with the application of heat.

As an example of my invention I will recite a specific example of a way to obtain a red color upon slate granules, with a permanent tightly adherent glazed surface. It will be understood primarily that a colorless silicate together with a lead salt, heated within the range of fusion of slate, will form a glass that forms a permanent surface on slate granules. The glass produced is normally clear; but may easily be colored with pigments. If placed upon the exterior of mineral granules it may remain clear; but in most cases it will be colored by the absorption of pigments from the granule surfaces. In the case of slate, the product without added pigments usually assumes a blackish appearance. The pigment also may be those which are added to the original solution in a form which will be converted by the heat of the necessary temperature range into an oxide, or other pigment, or else the pigment may be one which is in its final form when added and does not change.

In producing glazed red slate from the green slate of commerce, the slate is first crushed to granular form. It is then treated with a solution which I will state in grams and cubic centimeters, as applicable to 400 grams of dry green crushed slate. The solution is made with 30 cubic centimeters of water, with 10 grams lead acetate, and 5 grams borax, to facilitate the formation of a good glass, acting as a flux. The granular slate will take up this solution and to the moist slate is added ten grams of sodium silicate preferably of factor 1 $Na_2O$ to 3.25 $SiO_2$ and the products well mixed. Finally 45 grams of powdered iron sulphate are mixed into the product and a roasting operation is carried on. I have employed 1800 degrees F. for fifteen minutes, accompanied by agitation, in an oxidizing atmosphere.

When the mass begins to coalesce and show a tendency to flow it is removed from the roaster, or kiln, and cooled in air, whereupon the granules will separate easily, without having formed any permanently agglomerated masses or lumps.

A mastic coated felt base can then be surface coated in the usual manner with the colored granules to produce a roofing product.

The granules have a bright glazed appearance and a good red color, and prolonged attempts to break down this color with heat and water, have failed, proving a very tight bond of the glaze with the granules.

The use of chromic oxide in a like process will give a glazed green granule, and copper sulphate will result in a brownish black.

The glaze is actually a hard and adherent insoluble glass, and the granules coated with it are brilliant in appearance.

My process consists essentially in forming upon granular surfacing material a coating of a glass of lower melting point than the material to which it is applied. The essentials of my process comprise forming such a glass out of a silicate and a metal together with such pigments or coloring matters as may be desired. It is obvious that if any of the constituents required to form the glass are to be found in sufficient quantity in the granular mineral matter, itself, they need not be added to it, or proportionately lessened amounts can be added.

I am aware that it has been proposed to coat the surface of roofing materials covered with granular mineral matter with glass deposited by a physical process involving melting and spraying. So far as I am aware, however, no one has hitherto taken granular surfacing materials and covered them, as such, with a coating of glass. Nor do I know of any one who has formed glass by fusion from its constituents upon the surface of granulated mineral materials. Nor, further, am I aware of any one who has formed a glass upon the surface of granular mineral materials using a process to color the glass in the course of its formation. As to the coloring matters used, they may, as indicated, be either original in the slate itself or be added in the course of my process; and the coloring materials may be in the nature of pigments which will retain their natural color in the glassy body or they may be substances which will color the glass by colloidal solution or otherwise.

Having thus described my invention, what I claim as new and desire to secure by Letters Patent, is:—

1. The process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together.

2. That process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together, said heating treatment being stopped at the moment of fusion and the product cooled in air.

3. That process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together, said granular mineral consisting of crushed slate.

4. That process of forming a glaze on granular mineral material which will withstand a roasting treatment, such as slate, which consists in subjecting the granular material to a soluble lead salt solution, then subjecting it to a soluble silicate, and finally roasting to the point of fusion, and cooling in air.

5. That process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together, there being a pigment added to the granular material along with said soluble substances.

6. That process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together, there being a pigment added to the granular material along with said soluble substances, said pigment being in the form of a metal salt which is reduced to its oxide during the roasting.

7. That process of forming a red granular slate which consists in treating the slate with lead acetate, and a flux, and with sodium silicate, and with iron sulphate, and then roasting at a temperature sufficient to form a glass and to form an iron oxide from the iron sulphate.

8. That process of producing glazed granular material which consists in depositing on granular mineral matter which will withstand a roasting treatment, a metal salt and a soluble silicate which will react to form an insoluble metal glass and then subjecting the granules to heat and agitation to fuse said metal silicate on the granules without permanent agglomeration of the granules together, there being a pigment added to the granular material after adding the silicate and before roasting.

9. A granular mineral material coated throughout the surfaces of the granules with a fused insoluble metal glass of lower melting point than the granular material.

10. A granular mineral material coated throughout the surfaces of the granules with a fused insoluble metal glass of lower melting point than the granular material, said granular material being crushed slate.

11. A process for forming colored granular mineral which consists in applying to the granular material while cold a wet adhesive material which on fusion will form an insoluble metal glass on the granules, and then roasting the product accompanied by agitation to a temperature of fusion and at once cooling in air, whereby a substance in granular form and not permanently agglomerated in balls, and with a permanently adhesive glaze is produced, said granular material being of a character to withstand a roasting treatment.

12. A surfacing material comprising a mastic coated base having a coating thereon of granular material which will withstand roasting temperatures coated throughout the surface of the granules thereof with a fused coating of lower melting point than the granules.

13. A surfacing material comprising a mastic coated base having a coating thereon of granules of mineral material substantially wholly coated with a fused glaze of lower melting point than the granules.

14. A surfacing material comprising a mastic coated base having a coating thereon of granular material which will withstand roasting temperatures coated throughout the surface of the granules thereof with a fused coating containing a coloring compound, said glaze being of lower melting point than the granular material.

15. A surfacing material comprising a mastic coated base having a coating thereon of granular mineral material coated throughout the surfaces of the granules thereof with a fused coating of lower melting point than the granules.

16. A surfacing material comprising a mastic coated base having a coating thereon of granular mineral material coated throughout the surfaces of the granules thereof with a fused coating of lower melting point than the granules, said fused coating containing a coloring compound.

17. In a roofing material a mastic coated base having a coating thereon of granular mineral material coated throughout the surfaces of the granules with a fused insoluble metal glass of lower melting point than the granular material.

18. In a roofing material a mastic coated base having a coating thereon of granular mineral material coated throughout the surfaces of the granules with a fused insoluble metal glass of lower melting point than the granular material and containing a coloring compound.

19. A surfacing material comprising a mastic coated base having a coating thereon of schistaceous granular material which will withstand roasting temperatures coated throughout the surfaces of the granules thereof with a fused coating of lower melting point than the granules.

20. A granular mineral material coated substantially throughout the surfaces of the granules with a fused insoluble metal glass containing a pigment material, the material of the glass being in a physical condition whereby it melts before the granular material melts.

21. A granular mineral material coated substantially throughout the surfaces of the granules with a fused insoluble metal glass containing a pigment material, the material of the glass being deposited on said granule as a distinct thin coating whereby it undergoes melting on said granule before the granule base material melts.

22. The process of producing a granular mineral material capable of withstanding wasting temperatures coated substantially throughout the surface of the granules with a fused insoluble metal glass containing a pigment material, the step which comprises applying the material to the granule in a physical condition whereby it melts before the granular base granule, and then heating to form the glass.

23. A granular mineral material comprising base granules, which will withstand roasting temperatures, coated substantially throughout the surfaces of the granules with a fused insoluble metal glass containing a coloring agent and wherein the glass is in such physical condition that it melts before the base granule.

24. A roofing material comprising a base, the surface of which is mineralized with glazed granular material as set forth in claim 20.

25. A roofing material comprising a base, the surface of which is mineralized with glazed granular material as set forth in claim 21.

26. A roofing material comprising a base, the surface of which is mineralized with glazed granular material as set forth in claim 23.

HARRY C. FISHER.

CERTIFICATE OF CORRECTION.

Reissue No. 20,295. March 16, 1937.

HARRY C. FISHER.

It is hereby certified that error appears in the printed specification of the above numbered patent requiring correction as follows: Page 3, first column, line 14, claim 22, for the word "wasting" read roasting; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)